(12) United States Patent
Munezuka et al.

(10) Patent No.: US 12,151,627 B2
(45) Date of Patent: Nov. 26, 2024

(54) ELECTRICAL JUNCTION BOX

(71) Applicant: Yazaki Corporation, Tokyo (JP)

(72) Inventors: Masato Munezuka, Kakegawa (JP); Masayo Matsuura, Kakegawa (JP); Eisuke Suzuki, Tokyo (JP)

(73) Assignee: Yazaki Corporation, Tokyo (JP)

( * ) Notice: Subject to any disclaimer, the term of this patent is extended or adjusted under 35 U.S.C. 154(b) by 485 days.

(21) Appl. No.: 17/474,440

(22) Filed: Sep. 14, 2021

(65) Prior Publication Data
US 2022/0080906 A1 Mar. 17, 2022

(30) Foreign Application Priority Data
Sep. 14, 2020 (JP) ................................. 2020-153775

(51) Int. Cl.
 *B60R 16/023* (2006.01)
 *H01R 25/16* (2006.01)
 *H02G 3/08* (2006.01)
(52) U.S. Cl.
 CPC ......... *B60R 16/0238* (2013.01); *H01R 25/16* (2013.01); *H02G 3/086* (2013.01)
(58) Field of Classification Search
 CPC ............ H02G 3/08; H02G 3/086; H02G 3/16; H02G 3/081; H02G 3/088; B60R 16/0238; H01R 25/16
 See application file for complete search history.

(56) References Cited

U.S. PATENT DOCUMENTS

2015/0132978 A1  5/2015  Tashiro et al.
2020/0094701 A1* 3/2020  Asai ........................ B60L 53/14

FOREIGN PATENT DOCUMENTS

| JP | H09-080080 A | 3/1997 |
| JP | H11-032415 A | 2/1999 |
| JP | 2012243700 A | * 12/2012 |
| JP | 2014-027724 A | 2/2014 |

* cited by examiner

*Primary Examiner* — Abdullah A Riyami
*Assistant Examiner* — Amara Anderson
(74) *Attorney, Agent, or Firm* — Banner & Witcoff, Ltd.

(57) ABSTRACT

An electrical junction box includes a housing, a bus bar including a first flat plate portion having a first bolt hole, a plate having a window portion, a plate-shaped terminal including a second flat plate portion having a second bolt hole and configured to be assembled to the plate so as to close the window portion, and a fastening member configured to be inserted into the first bolt hole and the second bolt hole to fasten and fix the bus bar and the terminal together to the housing. The housing and the plate are configured such that the first flat plate portion and the second flat plate portion are stacked to each other and the first bolt hole and the second bolt hole are coaxially arranged by assembling the plate to the housing to which the bus bar is assembled.

6 Claims, 5 Drawing Sheets

ELECTRICAL JUNCTION BOX

CROSS-REFERENCE TO RELATED APPLICATIONS

This application is based on and claims priority under 35 USC 119 from Japanese Patent Application No. 2020-153775 filed on Sep. 14, 2020, the contents of which are incorporated herein by reference.

Technical Field

The present disclosure relates to an electrical junction box,

Background Art

In the related art, for example, an electrical junction box assembled to a vehicle battery to connect between the battery and various electrical components has been proposed. For example, one of related-art electrical junction boxes includes a housing to which a plate-shaped bus bar to be connected to a battery or an electrical component is assembled (see, for example, JP-A-2014-027724).

For example, in order to measure a temperature of a heat generating component such as a relay assembled to an electrical junction box, a plate-shaped terminal to which a thermistor element is attached may be disposed so as to overlap the bus bar, and the bus bar and the terminal may be fastened together to the relay by a bolt. In this case, heat generated in the relay is transmitted to the terminal via the bolt and the bus bar, so that a temperature of the terminal changes according to the temperature of the relay. Therefore, the temperature of the relay can be measured by detecting the temperature of the terminal with the thermistor element.

In a co-fastening work of the bus bar and the terminal, it is necessary to align the terminal with respect to the bus bar such that bolt holes formed in the bus bar and the terminal are arranged coaxially with each other. Further, in order to appropriately maintain the orientation of the terminal, it is also necessary to suppress the rotation of the terminal during the tightening of the bolt. In order to facilitate the co-fastening work of the bus bar and the terminal, it is desirable that the alignment of the terminal can be easily performed and the rotation of the terminal can be easily suppressed.

SUMMARY

The present disclosure has been made in view of the above circumstances, and an object thereof is to provide an electrical junction box capable of facilitating a co-fastening work of a bus bar and a terminal.

In order to achieve the above object, for example, there is provide an electrical junction box including:
  a housing;
  a plate-shaped bus bar including a first flat plate portion and configured to be assembled to the housing, the first flat plate portion having a first bolt hole;
  a plate having a window portion and configured to be assembled to the housing;
  a plate-shaped terminal including a second flat plate portion and configured to be assembled to the plate so as to close the window portion, the second flat plate having a second bolt hole; and
  a fastening member configured to be inserted into the first bolt hole and the second bolt hole to fasten and fix the bus bar and the terminal together to the housing,
in which the housing and the plate are configured such that the first flat plate portion and the second flat plate portion are stacked to each other and the first bolt hole and the second bolt hole are coaxially arranged by assembling the plate to the housing to which the bus bar is assembled.

As described above, according to the present disclosure, the electrical junction box capable of facilitating the co-fastening work of the bus bar and the terminal can be provided.

The present disclosure has been briefly described as above. Further, details of the present disclosure will be further clarified by reading a mode for carrying out the disclosure described below with reference to the accompanying drawings.

DESCRIPTION OF EMBODIMENTS

Embodiment

Hereinafter, an electrical junction box 1 according to an embodiment of the present disclosure illustrated in FIGS. 1, 2, 3A to 3D, and 4A and 4B will be described with reference to the drawings. The electrical junction box 1 is used by being assembled to, for example, a vehicle battery, and has a function of electrically connecting the battery to an in-vehicle electrical component via a bus bar, a relay, or the like.

Figure 1:
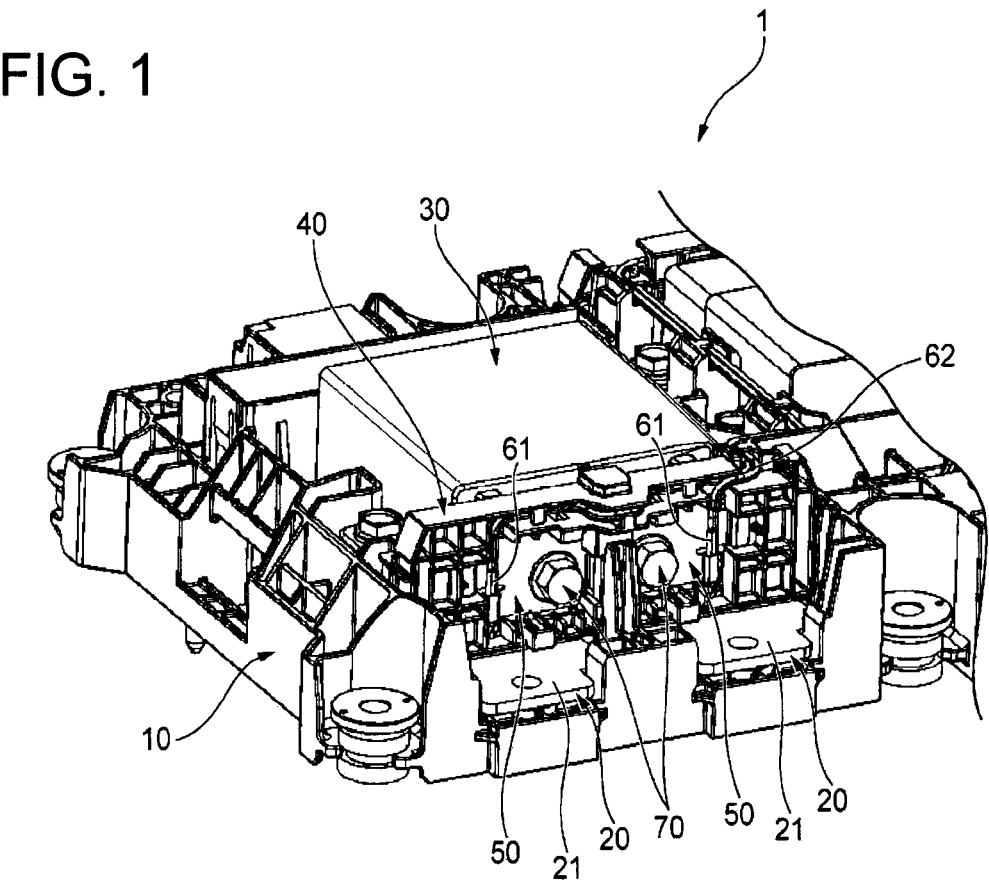
FIG. 1 is a perspective view illustrating a part of an electrical junction box according to an embodiment of the present disclosure.
Figure 1:
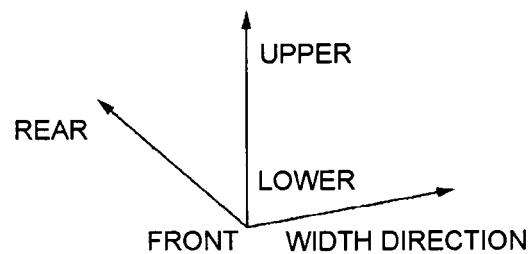

Hereinafter, for convenience of description, a "front-rear direction", a "width direction", an "upper-lower direction", "front", "rear", "upper", and "lower" are defined as illustrated in FIG. 1. The "front-rear direction", the "width direction", and the "upper-lower direction" are orthogonal to each other. The upper-lower direction coincides with the upper-lower direction of the vehicle on which the electrical junction box 1 is mounted.

Figure 2:
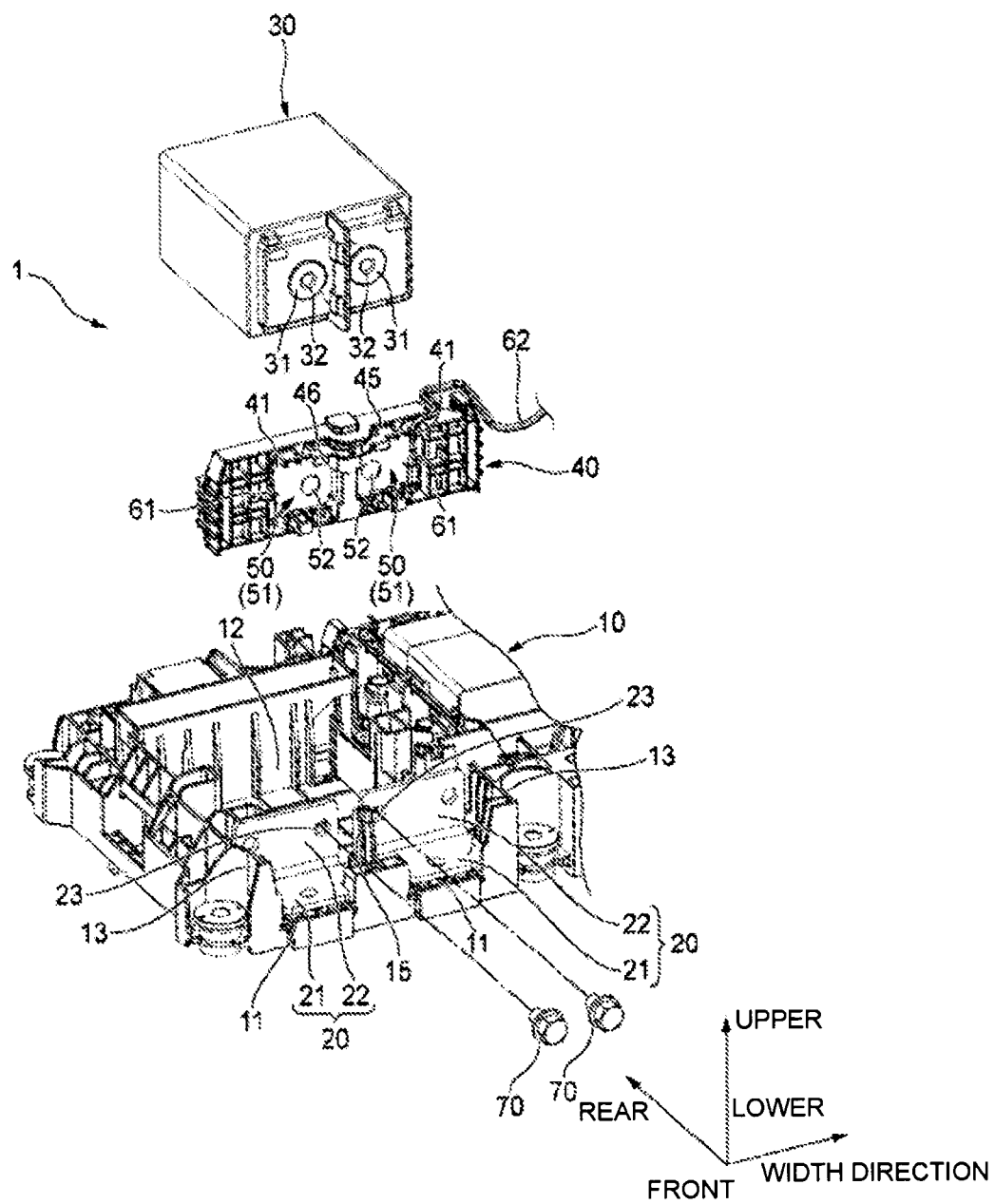
FIG. 2 is a perspective view of the electrical junction box illustrated in FIG. 1 in which a plate to which terminals are assembled and a relay box are separated from a housing.

As illustrated in FIGS. 1 and 2, the electrical junction box 1 includes a housing 10, a pair of bus bars 20 assembled to the housing 10, a relay box 30 assembled to the housing 10, a plate 40 assembled to the housing 10, and a pair of terminals 50 attached to the plate 40. Hereinafter, a configuration of each component of the electrical junction box 1 will be described in order.

First, the housing 10 will be described. The housing 10 is a resin molded body, and as illustrated in FIG. 2, has a substantially rectangular flat plate shape that extends in the front-rear direction and the width direction and is long in the width direction. In a region on one side in the width direction with respect to a center in the width direction of the housing 10, a pair of bus bar accommodating portions 11 are formed at a front end portion so as to be arranged at an interval in the width direction, and a relay box accommodating portion 12 is formed adjacent to a rear side of the pair of bus bar accommodating portions 11, Each of the pair of bus bar accommodating portions 11 and the relay box accommodating portion 12 is a recessed portion recessed downward and opened upward.

Figure 3A:
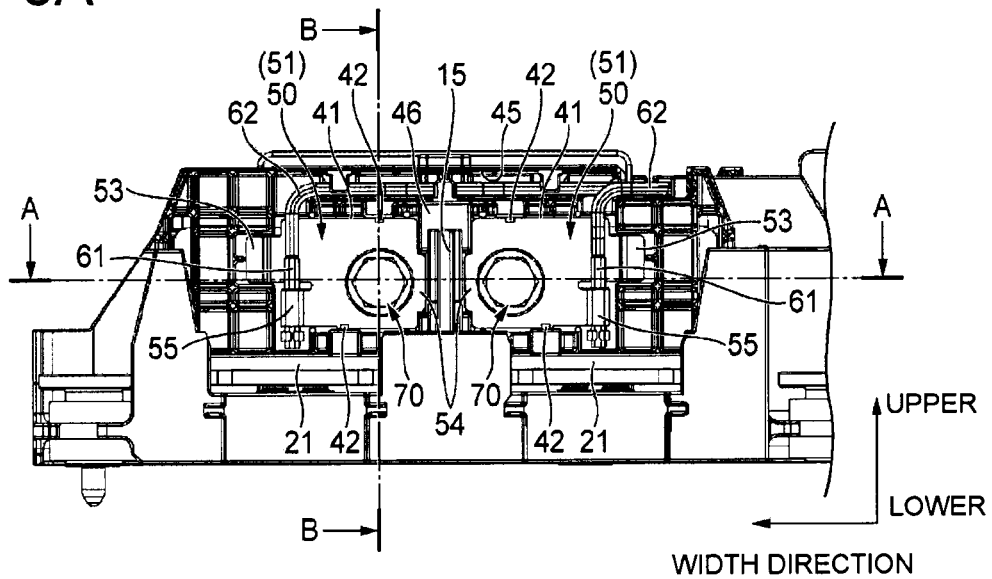
FIG. 3A is a front view of a main portion of the electrical junction box illustrated in FIG. 1.
Figure 3B:
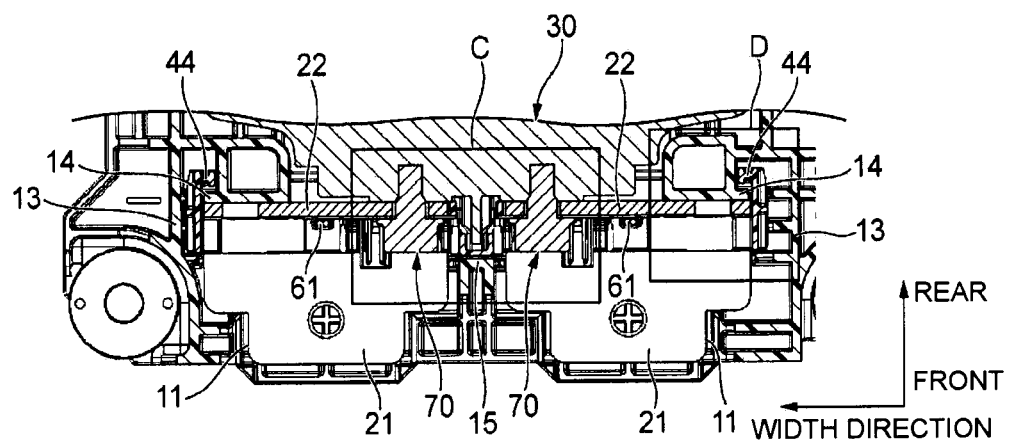
FIG. 3B is a cross-sectional view taken along line A-A of FIG. 3A.
Figure 3C:
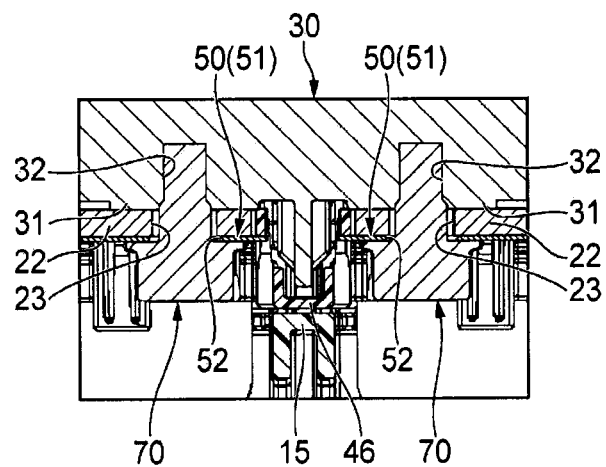
FIG. 3C is an enlarged view of a portion C of FIG. 3B.
Figure 3D:
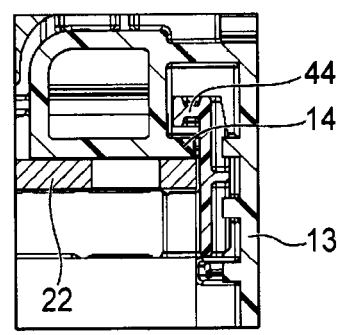
FIG. 3D is an enlarged view of a portion D of FIG. 3B.

As illustrated in FIGS. 2 and 3B, a pair of side wall portions 13 which define both end edges in the width direction of the pair of bus bar accommodating portions 11 are provided in the housing 10 so as to protrude upward and extend in the front-rear direction. As illustrated in FIGS. 3B and 3D, a pair of locking portions 14 are provided at rear end portions of the pair of side wall portions 13. The pair of locking portions 14 are engaged with a pair of locking portions 44, which will be described later, of the plate 40.

As illustrated in FIGS. 2 and 3A to 3C, a central column portion 15 protruding upward at a central portion in the front-rear direction between the pair of bus bar accommodating portions 11 is provided in the housing 10 so as to divide the pair of bus bar accommodating portions 11 into two portions in the width direction. The central column portion 15 is engaged with a locking portion 46, which will be described later, of the plate 40.

Next, the pair of bus bars 20 will be described. In this example, one bus bar 20 and the other bus bar 20 have symmetrical shapes in the width direction. Each bus bar 20 is formed by performing press working, bending, or the like on one metal plate. As illustrated in FIG. 2, each bus bar 20 includes a horizontal portion 21 having a flat plate shape that extends in the front-rear direction and the width direction, and a vertical portion 22 having a flat plate shape that protrudes upward from a rear end edge portion extending in the width direction of the horizontal portion 21 and extends in the width direction, and has a substantially L shape when viewed from the width direction. A bolt hole 23 penetrating in the front-rear direction is formed in the vertical portion 22.

As illustrated in FIG. 2, the pair of bus bars 20 are assembled and fixed to the pair of bus bar accommodating portions 11 of the housing 10 from above. As a result, the vertical portions 22 of the pair of bus bars 20 extend in the width direction so as to partition the pair of bus bar accommodating portions 11 and the relay box accommodating portion 12 in the front-rear direction. In the pair of bus bars 20 assembled to the housing 10 as described above, an electric wire (not illustrated) extending from a battery mounted on the vehicle is connected to the horizontal portion 21 of the one bus bar 20, and an electric wire (not illustrated) extending from an electrical component mounted on the vehicle is connected to the horizontal portion 21 of the other bus bar 20.

Next, the relay box 30 will be described. As illustrated in FIG. 2, the relay box 30 includes a substantially rectangular parallelepiped housing made of resin, Various relays, fuses, or the like (not illustrated) are built in the relay box 30. A pair of contact portions 31 protruding forward are provided on a front end surface of the relay box 30 so as to be arranged in the width direction. The pair of contact portions 31 are formed of conductive members, and is electrically connected to the various relays or the like built in the relay box 30.

On top surfaces (front end surfaces) of the pair of contact portions 31, a pair of bolt holes 32 are provided so as to be recessed rearward corresponding to the pair of bolt holes 23 arranged in the width direction of the pair of bus bars 20 assembled to the housing 10. An inner wall surface of each bolt hole 32 is threaded so as to function as a female screw Stay portions (not illustrated) are provided on both end surfaces in the width direction of the relay box 30. A screw hole (not illustrated) penetrating in the upper-lower direction is formed in the stay portion.

The relay box 30 is assembled from above to the relay box accommodating portion 12 of the housing 10 to which the pair of bus bars 20 are assembled, and is fastened and fixed to the housing 10 by using a screw (not illustrated) inserted into the screw hole. By assembling the relay box 30 to the housing 10 as described above, as illustrated in FIGS. 3B, 3C, and 4A and 4B, the pair of contact portions 31 of the relay box 30 are stacked and disposed on rear sides of the vertical portions 22 of the pair of bus bars 20, and each of the pair of bolt holes 32 is disposed coaxially with each of the pair of bolt holes 23.

Next, the plate 40 will be described. The plate 40 is a resin molded body, and as illustrated in FIG. 2, has a substantially rectangular flat plate shape that extends in the upper-lower direction and the width direction and is long in the width direction. A pair of substantially rectangular window portions 41 penetrating the plate 40 in the front-rear direction are formed at a central portion of the plate 40 in the width direction so as to be arranged side by side at an interval in the width direction.

Figure 4A:
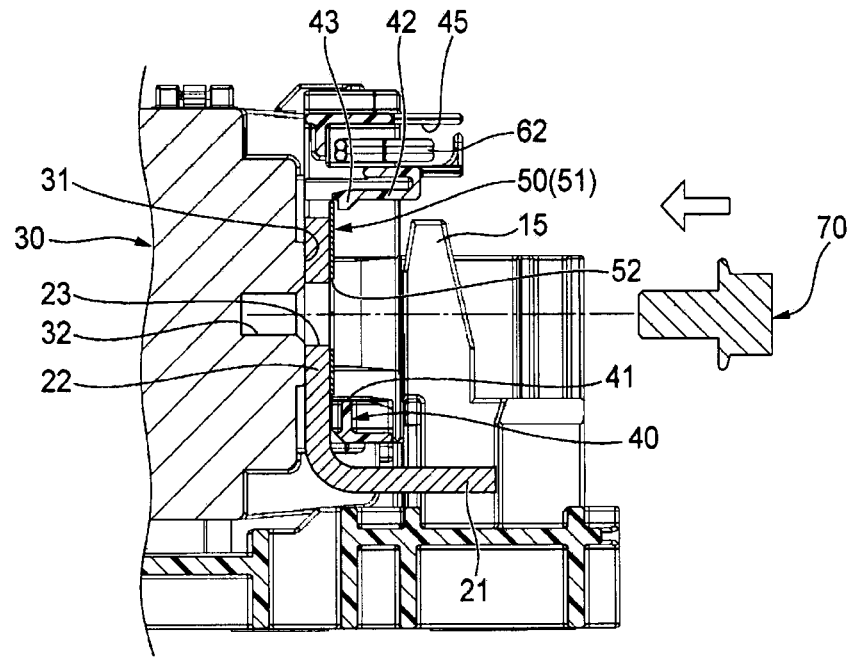
FIG. 4A is a view corresponding to a B-B cross section of FIG. 3A in a state where a bolt is separated.
Figure 4B:
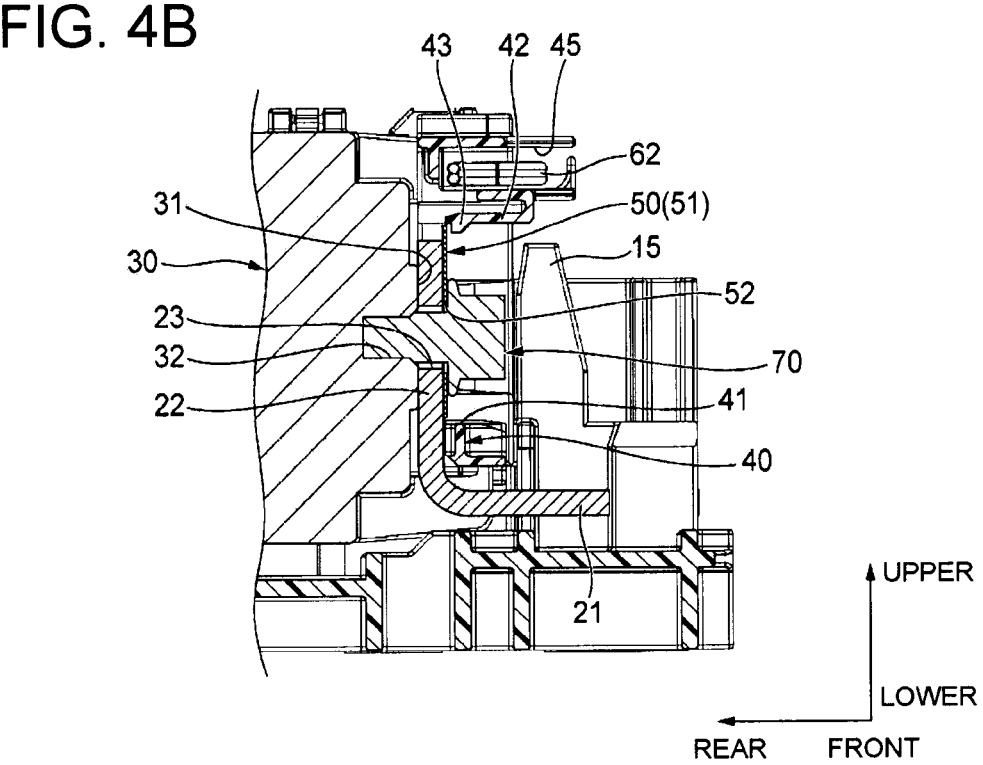
FIG. 4B is a B-B cross-sectional view of FIG. 3A.

As illustrated in FIGS. 3A, 4A and 4B, a cantilevered locking piece 42 extending rearward is provided on each of an upper edge portion and a lower edge portion of each window portion 41. Each locking piece 42 is elastically deformable in the upper-lower direction. A protruding portion 43 that protrudes toward an inside in the upper-lower direction (a central side of the window portion 41) is formed at a front end portion (rear end portion) of each locking piece 42. As illustrated in FIGS. 3B and 3D, a pair of locking portions 44 protruding rearward are provided at both end portions of the plate 40.

As illustrated in FIGS. 2, 3A, and 4A and 4B, an electric wire accommodating groove 45 recessed rearward and extending in the width direction is formed on a front surface of an upper end edge portion of the plate 40. As illustrated in FIGS. 2, 3A, and 3C, the locking portion 46 that protrudes forward and extends in the upper-lower direction is provided on a front surface of the central portion of the plate 40 in the width direction.

Next, the pair of terminals 50 will be described. In this example, the one bus bar 50 and the other bus bar 50 have symmetrical shapes in the width direction. Each terminal 50 is formed by performing press working, bending, or the like on one metal plate. As illustrated in FIG. 2, each terminal 50 has a flat plate portion 51 extending in the upper-lower direction and the width direction. The flat plate portion 51 has a substantially rectangular shape corresponding to the window portion 41 of the plate 40. A bolt hole 52 penetrating in the front-rear direction (plate thickness direction) is formed in the flat plate portion 51.

As illustrated in FIG. 3A, locking pieces 53, 54 extending outward in the width direction are provided at predetermined locations of both edge portions of the flat plate portion 51 in the width direction, respectively, A crimp portion 55 to which a thermistor element 61 is crimped and fixed is provided at an outer edge portion of the flat plate portion 51 in the width direction. The thermistor element 61 can detect a temperature of the flat plate portion 51 (accordingly, the terminal 50). One end of an electric wire 62 is connected to the thermistor element 61. The other end of the electric wire 62 is connected to a control unit (not illustrated) that receives a signal from the thermistor element 61 and detects the temperature of the terminal 50.

The pair of terminals 50 are assembled to the pair of window portions 41 from a front side so as to close the pair of window portions 41 of the plate 40. In this process, when an edge portion of the flat plate portion 51 of the terminal 50 presses the protruding portion 43 of each locking piece 42 provided in the window portion 41, each locking piece 42 is temporarily elastically deformed outward in the upper-lower direction, and when the edge portion of the flat plate portion 51 climbs over each protruding portion 43, each locking piece 42 is elastically returned inward in the upper-lower direction, and the assembling of the terminal 50 to the window portion 41 is completed. A portion of the electric wire 62 extending from the thermistor element 61 provided in each terminal 50 in the vicinity of the thermistor element 61 is accommodated in the electrode wire accommodating groove 45 of the plate 40 in a bundled state so as to extend in the width direction (see FIG. 2).

In a state where the pair of terminals 50 are assembled to the window portion 41, rear surfaces of the locking pieces 53, 54 of the terminal 50 are locked to a front surface of the edge portion of the window portion 41, and a front surface of the edge portion of the flat plate portion 51 of the terminal 50 is locked to a front end (rear end) of the protruding portion 43 of the locking piece 42 of the window portion 41. As a result, the terminal 50 is prevented from falling off from the window portion 41 in both the front and rear directions. In a state where the pair of terminals 50 are assembled to the plate 40, as illustrated in FIG. 2, the bolt holes 52 of the pair of terminals 50 are arranged at an interval in the width direction corresponding to the pair of bolt holes 32 of the relay box 30 and the pair of bolt holes 23 of the pair of bus bars 20 assembled to the housing 10.

The plate 40 to which the pair of terminals 50 are assembled is assembled from above into a space extending in the width direction surrounded by the vertical portions 22 of the pair of bus bars 20, the pair of side wall portions 13, and the central column portion 15 in the housing 10 to which the pair of bus bars 20 and the relay box 30 are assembled. In a state where the plate 40 is assembled to the housing 10, the pair of side wall portions 13 of the housing 10 are engaged in the width direction to both end surfaces in the width direction of the plate 40, the pair of locking portions 14 of the housing 10 are engaged in the front-rear direction to the pair of locking portions 44 of the plate 40, and the central column portion 15 of the housing 10 is engaged in the front-rear direction to the locking portion 46 of the plate 40.

As a result, only by assembling the plate 40 to the housing 10, the plate 40 is appropriately positioned with respect to the housing 10, the flat plate portions 51 of the pair of terminals 50 are stacked and disposed on the front side of the vertical portions 22 of the pair of bus bars 20, and the bolt holes 52 of the pair of terminals 50 are coaxially disposed with respect to the pair of bolt holes 23 of the pair of bus bars 20 (and the pair of bolt holes 32 of the relay box 30). Therefore, it is not necessary to separately align the pair of terminals 50 with respect to the pair of bus bars 20.

As described above, in a state where the pair of bus bars 20, the relay box 30, and the plate 40 to which the pair of terminals 50 are assembled are assembled to the housing 10, the pair of bolts 70 (see FIG. 2) are sequentially inserted into the pair of bolt holes 52 and the pair of bolt holes 23 from the front and screwed into the pair of bolt holes 32 of the relay box 30.

Accordingly, the pair of bus bars 20 and the pair of terminals 50 are fixed to the housing 10 by being fastened together to the relay box 30 fixed to the housing 10 by the pair of bolts 70. In this process, since each terminal 50 is non-rotatably assembled to the plate 40 that is non-rotatably assembled to the housing 10, the terminal 50 is not rotatable with respect to the bus bar 20. Therefore, rotation of the terminal 50 during the tightening of the bolt 70 is suppressed.

Further, since the pair of bus bars 20 and the pair of terminals 50 are fastened together to the relay box 30 by the pair of bolts 70, the locking pieces 53, 54 (see FIG. 3A) of the pair of terminals 50 press the edge portions of the pair of window portions 41 of the plate 40 rearward by a force caused by an axial force of the bolts 70. Accordingly, the plate 40 presses the vertical portions 22 of the pair of bus bars 20 rearward with respect to the relay box 30 (the pair of contact portions 31). Accordingly, the plate 40 is sandwiched so as to be compressed in the front-rear direction by the locking pieces 53, 54 of the terminals 50 and the vertical portions 22 of the pair of bus bars 20. As a result, since the plate 40 is firmly fixed to the housing 10, generation of abnormal noise caused by resonance of the plate 40 due to vibration of the housing 10 can be suppressed.

As described above, when the pair of bus bars 20 and the pair of terminals 50 are fastened together to the relay box 30 by the pair of bolts 70, the assembly of the electrical junction box 1 is completed, and the electrical junction box 1 illustrated in FIG. 1 is obtained. In the electrical junction box 1 where the assembly is completed, the electric wire (not illustrated) extending from the battery mounted on the vehicle is connected to the horizontal portion 21 of the one bus bar 20, and the electric wire (not illustrated) extending from the electrical component mounted on the vehicle is connected to the horizontal portion 21 of the other bus bar 20.

Accordingly, the battery is electrically connected to the electrical component via the one bus bar 20, the relay box 30, and the other bus bar 20. In this state, by operating the relays or the like in the relay box 30 of the electrical junction box 1, electric power generated by the battery is supplied to the electrical component.

When the relays or the like in the relay box 30 are operated, the relay box 30 generates heat. The heat generated in the relay box 30 is transmitted to the pair of terminals 50 via the pair of contact portions 31, the pair of bolts 70, and the pair of bus bars 20 (vertical portions 22). Therefore, the temperature of the terminals 50 changes according to the temperature of the relay box 30. As a result, by detecting the temperature of the terminals 50 by the thermistor elements 61 attached to the terminals 50, the temperature of the relay box 30 (therefore, the relays or the like) can be measured.

Operation and Effect

As described above, according to the electrical junction box 1 of the present embodiment, the vertical portion 22 of the bus bar 20 and the flat plate portion 51 of the terminal 50 are stacked, and the bolt hole 23 of the bus bar 20 and the bolt hole 52 of the terminal 50 are coaxially arranged only by assembling the plate 40 to which the terminal 50 is assembled to the housing 10 to which the bus bar 20 is assembled. Further, since each terminal 50 is non-rotatably assembled to the plate 40 that is non-rotatably assembled to the housing 10, the terminal 50 is not rotatable with respect to the bus bar 20. Therefore, according to the electrical junction box 1 of the present embodiment, the alignment of the terminal 50 can be easily performed, and the rotation of the terminal 50 can be easily suppressed, so that the co-fastening work of the bus bar 20 and the terminal 50 can be easily performed.

Further, according to the electrical junction box 1 of the present embodiment, the terminal 50 is connected to the bus bar 20 in order to detect the temperature of (the relays or the like built in) the relay box 30. Therefore, by detecting the temperature of the terminal 50, it is possible to detect the temperature of (the relays or the like built in) the relay box 30.

Further, according to the electrical junction box 1 of the present embodiment, the bus bar 20 and the terminal 50 are fastened together to the relay box 30 by the bolt 70. Therefore, the heal generated in the relay 30 is transmitted to the terminal 50 via the bolt 70 and the bus bar 20, so that the temperature of the terminal 50 changes according to the temperature of the relay box 30. As a result, by detecting the temperature of the terminals 50 by the thermistor elements 61 attached to the terminals 50, the temperature of the relay box 30 can be measured.

Further, according to the electrical junction box 1 of the present embodiment, when the plate 40 is assembled to the housing 10, the plate 40 is appropriately positioned with respect to the housing 10 by the pair of side wall portions 13, the pair of locking portions 14, and the central column portion 15 (positioning portion) of the housing 10. Therefore, since the bolt hole 23 and the bolt hole 52 are arranged more accurately and coaxially as compared with a case where such a positioning portion is not provided, the co-fastening work of the bus bar 20 and the terminal 50 can be performed more easily.

Other Embodiments

The present disclosure is not limited to the above-described embodiment and various modifications can be used within the scope of the present disclosure. For example, the present disclosure is not limited to the above-described embodiment, and may be appropriately modified, improved or the like. In addition, materials, shapes, dimensions, numbers, arrangement positions, and the like of components in the embodiment described above are optional and are not limited as long as the present disclosure can be achieved.

In the above-described embodiment, the relay box 30 assembled to the housing 10 is adopted as an "object to be detected", and the temperature is adopted as a "physical quantity". On the other hand, a battery cell assembled to the housing 10 may be adopted as the "object to be detected", and a voltage of the battery may be adopted as the "physical quantity". Further, a component that is not assembled to the housing 10 may be adopted as the "object to be detected".

Here, characteristics of the embodiment of the electrical junction box 1 according to the present disclosure described above are summarized briefly in the following [1] to [5].

[1] An electrical junction box (1) includes:
a housing (10);
plate-shaped bus bars (20) each including a first flat plate portion (22) and configured to be assembled to the housing (10), the first flat plate portion (22) having a first bolt hole (23);
a plate (40) having a window portion (41) and configured to be assembled to the housing (10);
a plate-shaped terminal (50) including a second flat plate portion (51) and configured to be assembled to the plate (40) so as to close the window portion (41), the second flat plate portion (51) having a second bolt hole (52); and
a fastening member (70) configured to be inserted into the first bolt hole (23) and the second bolt hole (52) to fasten and fix the bus bar (20) and the terminal (50) together to the housing (10),
wherein the housing (10) and the plate (40) are configured such that the first flat plate portion (22) and the second flat plate portion (51) are stacked to each other and the first bolt hole (23) and the second bolt hole (52) are coaxially arranged by assembling the plate (40) to the housing (10) to which the bus bars (20) are assembled.

[2] In the electrical junction box (1) according to [1],
the terminal (50) is connected to the bus bar (20) in order to detect a physical quantity related to an object to be detected (30).

[3] In the electrical junction box (1) according to [2],
the object to be detected is a relay (30) assembled to the housing (10),
the bus bar (20) and the terminal (50) are fixed to the housing (10) by fastening the bus bar (20) and the terminal (50) together to the relay (30) by the fastening member (70); and
an element (61) for detecting a temperature of the relay (30) is attached to the terminal (50).

[4] In the electrical junction box (1) according to any one of [1] to [3],
the housing (10) has a positioning portion (13, 14, 15) configured to position the plate (40), and
when the plate (40) assembled to the housing (10) is positioned with respect to the housing (10) by the positioning portion (13, 14, 15), the first bolt hole (23) and the second bolt hole (52) are coaxially arranged.

[5] In the electrical junction box (1) according to any one of [1] to [4], the window portion (41) penetrates from a front face of the plate (40) to a rear face of the plate (40) opposite to the front face.

According to the electrical junction box having a configuration of [1], the first plate portion of the bus bar and the second plate portion of the terminal are stacked to each other, and the first bolt hole of the bus bar and the second bolt hole of the terminal are coaxially arranged only by assembling the plate to which the terminal is assembled to the housing to which the bus bar is assembled. Further, since each terminal is non-rotatably assembled to the plate that is non-rotatably assembled to the housing, the terminal is not rotatable with respect to the bus bar. Therefore, according to the electrical junction box of the present configuration, the alignment of the terminal can be easily performed, and the rotation of the terminal can be easily suppressed, so that the co-fastening work of the bus bar and the terminal can be easily performed.

According to the electrical junction box having a configuration of [2], the terminal is connected to the bus bar in order to detect a physical quantity related to an object to be detected. Therefore, by detecting the physical quantity (temperature, voltage, or the like) of the terminal, the physical quantity related to the object to be detected can be detected.

According to the electrical junction box having a configuration of [3], the bus bar and the terminal are fastened together to the relay by the fastening member. Therefore, heat generated in the relay is transmitted to the terminal via the bolt and the bus bar, so that the temperature of the terminal changes according to a temperature of the relay. As a result, by detecting the temperature of the terminal by the element (thermistor element) that is for detecting the temperature of the relay and is attached to the terminal, the temperature of the relay can be measured.

According to the electrical junction box having a configuration of [4], when the plate is assembled to the housing, the plate is appropriately positioned with respect to the housing by the positioning portion of the housing. Therefore, since the first bolt hole and the second bolt hole are arranged more accurately and coaxially as compared with a case where such a positioning portion is not provided, the co-fastening work of the bus bar and the terminal can be performed more easily.

What is claimed is:

1. An electrical junction box comprising:
   a housing;
   a plate-shaped bus bar including a first flat plate portion and configured to be assembled to the housing, the first flat plate portion having a first bolt hole;
   a plate having a window portion and configured to be assembled to the housing;
   a plate-shaped terminal including a second flat plate portion and configured to be assembled to the plate so as to close the window portion, the second flat plate portion having a second bolt hole located within the window portion when being assembled to the plate; and
   a fastening member configured to be inserted into the first bolt hole and the second bolt hole to fasten and fix the bus bar and the terminal together to the housing,
   wherein the housing and the plate are configured such that the first flat plate portion and the second flat plate portion are stacked to each other and the first bolt hole and the second bolt hole are coaxially arranged by assembling the plate to the housing to which the bus bar is assembled.

2. The electrical junction box according to claim 1, wherein the terminal is connected to the bus bar in order to detect a physical quantity related to an object to be detected.

3. The electrical junction box according to claim 2, wherein the object to be detected is a relay assembled to the housing;
   wherein the bus bar and the terminal are fixed to the housing by fastening the bus bar and the terminal together to the relay by the fastening member; and
   wherein an element for detecting a temperature of the relay is attached to the terminal.

4. The electrical junction box according to claim 1, wherein the housing has a positioning portion configured to position the plate; and
   wherein when the plate assembled to the housing is positioned with respect to the housing by the positioning portion, the first bolt hole and the second bolt hole are coaxially arranged.

5. The electrical junction box according to claim 1, wherein the window portion penetrates from a front face of the plate to a rear face of the plate opposite to the front face.

6. The electrical junction box according to claim 1, wherein the plate-shaped terminal is configured to be assembled to the plate prior to assembling the plate-shaped terminal and plate to the housing.

* * * * *